(12) United States Patent  
Daken et al.

(10) Patent No.: US 8,799,124 B1  
(45) Date of Patent: Aug. 5, 2014

(54) METHOD AND SYSTEM FOR MATCHING FINANCIAL MANAGEMENT SYSTEM USERS WITH RELEVANTLY QUALIFIED ACCOUNTING PROFESSIONALS

(75) Inventors: Sean Daken, Louisville, CO (US); Samir Khosla, Cupertino, CA (US); Ian Vacin, Union City, CA (US); Eric de Guzman, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 44 days.

(21) Appl. No.: 13/284,188

(22) Filed: Oct. 28, 2011

(51) Int. Cl.  
*G06Q 40/00* (2012.01)

(52) U.S. Cl.  
USPC .......................................................... 705/35

(58) Field of Classification Search  
USPC .......................................................... 705/35  
See application file for complete search history.

(56) References Cited

U.S. PATENT DOCUMENTS

| | | | | |
|---|---|---|---|---|
| 5,752,237 | A * | 5/1998 | Cherny | 705/4 |
| 7,483,847 | B1 * | 1/2009 | Rymer et al. | 705/35 |
| 2001/0037219 | A1 * | 11/2001 | Malik | 705/2 |
| 2006/0059021 | A1 * | 3/2006 | Yulman et al. | 705/4 |
| 2008/0222295 | A1 * | 9/2008 | Robinson et al. | 709/227 |
| 2009/0204531 | A1 * | 8/2009 | Johnson | 705/35 |
| 2009/0276340 | A1 * | 11/2009 | Knapp | 705/30 |
| 2011/0055035 | A1 * | 3/2011 | Koskay et al. | 705/26.1 |
| 2012/0330822 | A1 * | 12/2012 | McGovern et al. | 705/39 |

OTHER PUBLICATIONS

Quotify Technology, Inc., www.quotify.com, 2011, 2 pages.

* cited by examiner

*Primary Examiner* — Hai Tran  
(74) *Attorney, Agent, or Firm* — Hawley Troxell Ennis & Hawley LLP; Philip McKay

(57) ABSTRACT

An accounting professional database is created that includes, but is not limited to, accounting professional profile data for one or more accounting professionals representing detailed information associated with the accounting professionals. A user of one or more financial management systems who may need the assistance of an accounting professional is identified and user need data indicating the detailed and specific accounting professional needs of the user is obtained. One or more matching criteria for the user are then determined/identified using the user need data and the one or more matching criteria for the user is used to search the accounting professional profile data in the accounting professional database to find one or more accounting professionals that match, or most closely match, the one or more matching criteria for the user.

15 Claims, 2 Drawing Sheets

METHOD AND SYSTEM FOR MATCHING FINANCIAL MANAGEMENT SYSTEM USERS WITH RELEVANTLY QUALIFIED ACCOUNTING PROFESSIONALS

BACKGROUND

Many businesses, including small businesses, have adopted, and come to rely on, one or more financial management systems such as, but not limited to, computing system, and/or on-line, financial management systems that provide bookkeeping, payroll, inventory, point-of-sale, and various other business related functions and capabilities.

For many business owners/managers, and particularly small business owners/managers, it is extremely important to identify, and secure the services of, accounting professionals, such as bookkeepers, payroll specialists, office managers, accountants, certified public accountants, consultants, and/or tax professionals, who are familiar with not only the particular financial management systems used by the small business, but also the type of business conducted by the small business owner, and the particular needs of the small business owner/small business. However, currently there are relatively few options for finding accounting professionals, and virtually none of these currently available options take into account, at least in any meaningful way, the specific needs of the small business owner, the financial management systems used by the small business, and the needs/availability of the accounting professionals.

Indeed, what few referral systems are available for identifying "relevant" accounting professionals typically refer the small business owner to accounting professionals based almost entirely on the needs of the provider of the referral, and/or the qualifications of the accounting professionals. As an example, many currently available referral systems recommend accounting professionals that have the highest, but not necessarily the most relevant, qualifications and/or certifications associated with a given financial management system provider. As a result, it often occurs that the same "highly certified" accounting professionals are recommended over and over. Not only can this result in these few accounting professionals being overwhelmed, but it also can mean many accounting professionals who are fully qualified for a particular business owner's needs are never considered, or even brought into the system.

In other cases, accounting professionals are recommended based on a single other criteria, such as location, determined to be the main criteria by the provider of the referral system, and often without regard to the specific needs of the small business owner, or the accounting professionals' needs.

In other cases, the accounting professionals are recommended, or prioritized, based on fees paid to the provider of the recommendation/referral. Once again, the result is that the recommendation/referral often has little alignment with the specific needs of the small business owner.

In short, currently available systems for identifying "relevant" accounting professionals are largely driven by the concerns/parameters of the provider of the financial management systems and/or, at best, the needs/desires of accounting professionals linked to, and/or certified through, the provider of the financial management systems, while and the business owner, and often the accounting professionals themselves, are more or less passive participants in the process.

What is needed is a method and system for recommending accounting professionals that not only takes into account the particular financial management system(s) used by the business, but also involves the business owners/managers, and the accounting professionals, in the process in order to recommend accounting professionals based on the specific needs of the small business owner and the needs, record, and availability, of the accounting professionals to be recommended.

SUMMARY

In accordance with one embodiment, a method and system for matching financial management system users with relevantly qualified accounting professionals includes a process for matching financial management system users with relevantly qualified accounting professionals whereby, in one embodiment, an accounting professional database is created that includes accounting professional profile data for one or more accounting professionals associated with, and/or certified with, one or more financial management systems. In various embodiments, the accounting professional profile data includes data representing detailed information associated with the accounting professionals.

In one embodiment, a user of one or more financial management systems who may need the assistance of an accounting professional is identified and user need data indicating the detailed and specific accounting professional needs of the user is obtained.

In one embodiment, one or more matching criteria for the user are determined/identified based, at least in part, on the user need data.

In one embodiment, the one or more matching criteria for the user are then used to search the accounting professional profile data in the accounting professional database to find one or more accounting professionals that match, or most closely match, the one or more matching criteria for the user.

In one embodiment, accounting professionals whose accounting professional profile data matches, or most closely matches, the one or more matching criteria for the user are further analyzed using one or more accounting professional referral parameters defined by the provider of the process for matching financial management system users with relevantly qualified accounting professionals to select user relevant accounting professionals to be recommended to the user in a potential accounting professional listing.

In one embodiment, one or more recommended user relevant accounting professionals are selected from the potential accounting professionals listing and then one or more actions are taken to provide communication between the user and the selected recommended user relevant accounting professionals.

Using one embodiment of the method and system for matching financial management system users with relevantly qualified accounting professionals, as discussed herein, an accounting professional referral system is provided that not only takes into account the particular financial management system(s) used by the business/user, but also automatically involves the business owners/managers and the accounting professionals in the process so that the resulting recommendations are based on the specific, and prioritized, needs of the small business owner and the specific, and prioritized, needs, record, and availability, of the accounting professionals. Consequently, using the method and system for matching financial management system users with relevantly qualified accounting professionals, as discussed herein, a better matching of users to accounting professionals can be obtained thereby not only saving time, energy, and frustration, but also ensuring that more accounting professionals are provided the opportunity to secure highly desired business leads.

As discussed in more detail below, using the below embodiments, with little or no modification and/or user/consumer input, there is considerable flexibility, adaptability, and opportunity for customization to meet the specific needs of various users/consumers under numerous circumstances.

Figure 1:
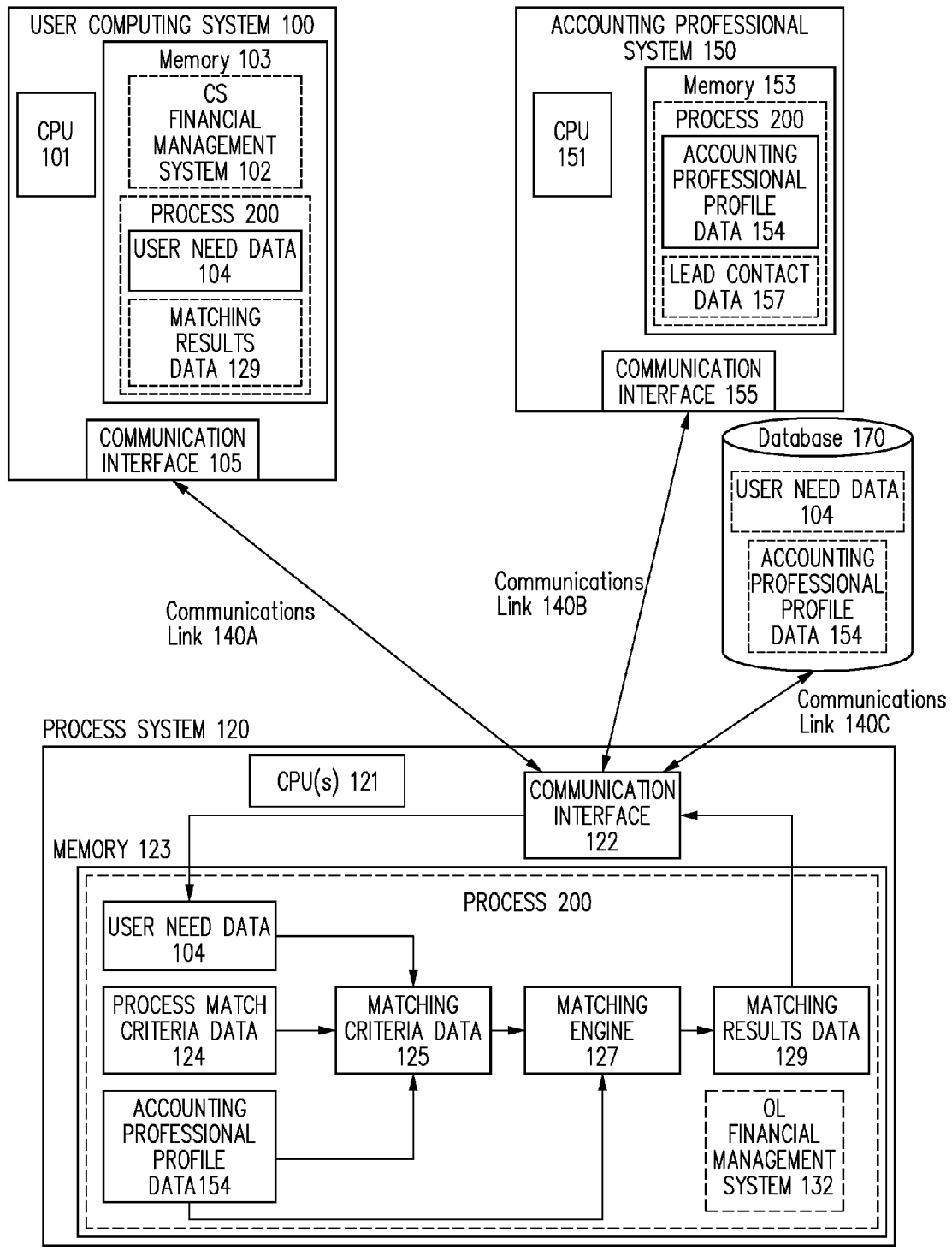
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for matching financial management system users with relevantly qualified accounting professionals includes a process for matching financial management system users with relevantly qualified accounting professionals.

In one embodiment, at least part of the process for matching financial management system users with relevantly qualified accounting professionals is implemented, at least in part, on one or more computing systems and/or one or more mobile computing systems.

Herein the term "computing system" includes, but is not limited to, any computing system known in the art at the time of filing, and/or as developed after the time of filing, such as, but not limited to: a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for matching financial management system users with relevantly qualified accounting professionals in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

In one embodiment, at least part of the process for matching financial management system users with relevantly qualified accounting professionals is, or is associated with, one or more applications and/or data management systems implemented on one or more computing systems accessible by the user.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, mobile applications, social media applications, data management systems, operating systems, interface systems, and/or financial management systems.

In various embodiments, the process for matching financial management system users with relevantly qualified accounting professionals is a "stand alone" system, package, program, module, or application.

In accordance with one embodiment, a financial management system is provided that is a parent system for, or is otherwise associated with, the process for matching financial management system users with relevantly qualified accounting professionals.

In one embodiment, the term "financial management" system includes, but is not limited to, any of the following: computing system implemented, and/or online, business management systems, packages, programs, modules, or applications; computing system implemented, and/or online, business financial management systems, packages, programs, modules, or applications; computing system implemented, and/or online, bookkeeping systems, packages, programs, modules, or applications; computing system implemented, and/or online, payroll systems, packages, programs, modules, or applications; computing system implemented, and/or online, inventory systems, packages, programs, modules, or applications; computing system implemented, and/or online, point-of-sale (POS) systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of currently available financial management systems include, but are not limited to: QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken™, available from Intuit, Inc. of Mountain View, Calif.; Quicken On-line™, available from Intuit, Inc. of Mountain View, Calif.; QuickReceipts™ available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management applications discussed herein, and/or known to those of skill in the art at the time of filing, and/or as developed after the time of filing.

In one embodiment, an accounting professional database is created that includes accounting professional profile data for one or more accounting professional that are certified by, and/or otherwise qualified with/for, and/or otherwise associated with, the financial management system.

Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

Herein, the term "accounting professional" includes, but is not limited to, bookkeepers, payroll specialists, office managers, accountants, certified public accountants, consultants, tax professionals, and/or any other party, or parties, whose services are used to implement, and/or maintain/use, one or more financial management systems and/or who help a business, or other party, implement, and/or maintain, financial practices and/or records.

In various embodiments, the accounting professionals profile database includes, but is not limited to, accounting professional profile data for one or more accounting professionals representing detailed information associated with the accounting professionals such as, but not limited to: the location of the accounting professionals and/or the accounting professionals' office or service areas; the financial management systems the accounting professionals are certified to work with, and the various types of certifications associated with accounting professionals; the accounting professionals' experience; consumer reviews associated with the accounting professionals; special qualifications and/or other certifications associated with the accounting professionals; and/or any other accounting professional profile information desired by the provider of the process for matching financial management system users with relevantly qualified accounting professionals.

In various embodiments, the accounting professionals themselves are provided the capability to prioritize, and/or highlight, desired portions of their accounting professional profile data, such as, but not limited to: the specific certifications considered most relevant by the accounting professionals; the special qualifications considered most relevant by the accounting professionals; the location of the accounting professionals services; the accounting professionals' experience; or any other accounting professional profile data the accounting professionals wish to have highlighted and/or given more significant weight. In this way, the accounting professionals themselves can indicate what portions of their accounting professional profile data they feel are most relevant and will lead to the best matches/leads.

In various embodiments, portions of the accounting professional profile data are highlighted, and/or weighted, by the provider of the method and system for matching financial management system users with relevantly qualified accounting professionals.

In various embodiments, the accounting professionals are also provided the opportunity to indicate a number, type, or targeted classification of, recommendations, user leads, and/or matches, desired by the accounting professionals.

In various embodiments, the accounting professional profile data is correlated and stored in the accounting professional database based on, but not limited to: one or more provider defined search parameters; one or more accounting professional referral parameters defined by the provider of the process for matching financial management system users with relevantly qualified accounting professionals; the accounting professional highlighted accounting professional profile data; and/or the provider highlighted accounting professional profile data; and or the accounting professional indicated desired number, type, or targeted classification of user leads.

In various embodiments, a user of one or more of the financial management systems who may need the assistance of an accounting professional is identified.

In one embodiment, the terms "user" and "user of a financial management system" include, but are not limited to, business owners, business managers, and/or any other party or parties designated by a business/business owner to manage all or part of the financial affairs of the business and/or to use, or otherwise interface, with one or more financial management systems used by the business.

In various embodiments, the user of the financial management system who may need the assistance of an accounting professional is identified through relatively passive means initiated by the user such as, but not limited to, the user signing up for the process for matching financial management system users with relevantly qualified accounting professionals through an offer or data entry field provided through the financial management system, and/or the user signing up for the process for matching financial management system users with relevantly qualified accounting professionals through a website associated with the financial management system, and/or any other method, means, process, or procedure whereby a user can initiate signing up for, and/or identifying themselves, to the process for matching financial management system users with relevantly qualified accounting professionals.

In various embodiments, the user of the financial management system who may need the assistance of an accounting professional is identified through relatively active means initiated by the provider of the financial management system, and/or the process for matching financial management system users with relevantly qualified accounting professionals, such as, but not limited to: obtaining contact information for the user at the time the user implements the financial management system and sending the user an e-mail, Short Message Service (SMS), or other text message, asking the user if the user has any accounting professional needs; obtaining contact information for the user at the time the user implements the financial management system and sending the user a letter, FAX, or other printed media asking the user if the user has any accounting professional needs; obtaining telephone contact information for the user at the time the user implements the financial management system and asking the user if the user has any accounting professional needs; and/or any other method, means, process, or procedure whereby a provider can initiate signing a user up for, and/or identifying a user to, the process for matching financial management system users with relevantly qualified accounting professionals.

In various embodiments, the user of the financial management system who may need the assistance of an accounting professional is identified through relatively automated means initiated by the provider of the financial management system, and/or the process for matching financial management system users with relevantly qualified accounting professionals, such as, but not limited to, obtaining user permission to scan the user's financial data entered into the financial management system and then scanning the data for indications that the user may need the assistance of one or more accounting professionals.

In various embodiments, the user of the financial management system who may need the assistance of an accounting professional is identified by any means, mechanism, process, and/or procedure, for identifying a user who may need the assistance of an accounting professional as discussed herein, and/or as known in the art/available at the time of filing, and/or as developed/made available after the time of filing.

In one embodiment, once a user of the financial management system that has an accounting professional need is identified, user need data indicating the specific accounting professional needs of the user is obtained.

In one embodiment, the user need data includes, but is not limited to, data indicating one or more of: the location of the user, the user's business, or a preferred location indicated by the user; the financial management system used by the user's business, and/or the version of the financial management system used; the accounting services desired by the user, such as bookkeeping services, point-of-sale services, payroll services, inventory services, financial management system training, financial management system set up, and/or financial management system data transfer; and/or any other specific user need data desired by the provider of process for matching financial management system users with relevantly qualified accounting professionals, and/or one or more users, as discussed herein, and/or as known in the art/available at the time of filing, and/or as developed/made available after the time of filing.

In various embodiments, the user need data is obtained from the user via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In various embodiments, the user need data is obtained by scanning the financial management system data and determining potential user accounting professional needs automatically.

In various embodiments, the user need data is obtained via one or more websites associated with the financial management system and/or the process for matching financial management system users with relevantly qualified accounting professionals.

In various embodiments, the user need data is determined and/or obtained via any of the methods, means, processes, and/or procedures discussed above with respect to identifying users of the financial management system who may need the assistance of an accounting professional, and/or any other method, means, processes, and/or procedures, as discussed herein, and/or as known in the art/available at the time of filing, and/or as developed/made available after the time of filing.

In various embodiments, the user is provided the capability to review, and/or edit, the user need data.

In various embodiments, the user is provided the capability to prioritize portions of the user need data which the user feels are particularly important for finding a relevant accounting professional and matching that accounting professional with the user.

For instance, in one specific illustrative example, the user can indicate that a user specified location being associated with an accounting professional, or within a specified radius, is more, or less, important, than the particular certification associated with an accounting professional. In various embodiments, the user can assign a priority to each piece of information associated with the user need data. In this way, in one embodiment, the user can customize the filters used to match one or more accounting professionals to the user's needs.

In one embodiment, one or more matching criteria for the user are determined/identified based, at least in part, on the user need data.

In one embodiment, the one or more matching criteria for the user can include, but are not limited to: matching criteria based on the location of the user, the user's business, or a preferred location indicated by the user; matching criteria based on the financial management system, or financial management system version, used by the user's business, and/or features of the financial management system used; matching criteria based on the accounting services desired by the user, such as bookkeeping services, point-of-sale services, payroll services, inventory services, financial management system training, financial management system set up, and/or financial management system data transfer; and/or any other matching criteria based on any parameters/desires of the provider of the process for matching financial management system users with relevantly qualified accounting professionals, and/or one or more users.

In various embodiments, the one or more matching criteria for the user are determined/identified under the direction of one or more processors associated with one or more computing systems.

In various embodiments, the one or more matching criteria for the user are presented to the user for review, editing, prioritization, and/or approval.

In one embodiment, the one or more matching criteria for the user, and/or the user need data, are stored/saved in a database or any computing system, as discussed herein, and/or as known in the art/available at the time of filing, and/or as developed/made available after the time of filing.

As noted above, herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

For instance, in one embodiment, the data is saved/stored in whole, or in part, in a memory system, or in a cache memory, or in any main memory or mass memory, associated with any computing system as discussed herein, and/or as known/available in the art at the time of filing, and/or as developed/made available after the time of filing. In one embodiment, the data, in whole, or in part, is stored in any computing system and/or server system, or other device, in another location, or on/in a computer readable medium, and/or any other computer program product, as defined herein. In one embodiment, the data, in whole, or in part, is stored on a webpage, in a web-based system, or on a public network such as the Internet.

In some embodiments, the data, stored as described above, is maintained, in whole, or in part, by: the process for matching financial management system users with relevantly qualified accounting professionals, and/or a provider of the process for matching financial management system users with relevantly qualified accounting professionals; a data management system, and/or a provider of a data management system; a financial management system, and/or a provider of a financial management system; a third party data storage institution; any third party service or institution; and/or any other parties. In some of these embodiments, access to the data is then provided to the process for matching financial management system users with relevantly qualified accounting professionals by providing access to the data and/or providing the data on a computer program product.

In one embodiment, the one or more matching criteria for the user, and/or the user need data, are used to search the accounting professional profile data in the accounting professional database to find one or more accounting professionals that match, or most closely match, the one or more matching criteria for the user.

In one embodiment, one or more accounting professionals whose accounting professional profile data matches, or most closely matches, the one or more matching criteria for the user are identified.

In one embodiment, accounting professionals whose accounting professional profile data matches, or most closely matches, the one or more matching criteria for the user are further analyzed using one or more accounting professional referral parameters defined by the provider of the process for matching financial management system users with relevantly qualified accounting professionals to select a predefined number of user relevant accounting professionals to be recommended to the user in a potential accounting professional listing.

In various embodiments, the accounting professional referral parameters defined by the provider of the process for matching financial management system users with relevantly qualified accounting professionals include, but are not limited to, one or more of: referral parameters based, at least in part, on data indicating the number of recent matches/leads provided to specific accounting professionals in the accounting professional database; referral parameters based, at least in part, on the number of matches/leads recently provided to the accounting professionals in the accounting professional database having the same certification and/or qualifications; referral parameters based, at least in part, on the number of successful matches/leads recently provided to specific accounting professionals in the accounting professional database; referral parameters based, at least in part, on the number of successful matches/leads recently provided to accounting professionals in the accounting professional database having the same certification and/or qualifications; referral parameters based, at least in part, on the number, and or quality of, reviews associated with specific accounting professionals in the accounting professional database; referral parameters based, at least in part, on the length of time specific accounting professionals in the accounting professional database have been qualified/certified at a given level, and/or the mix of qualifications/certifications associated with the specific accounting professionals; referral parameters based, at least in part, on one or more provider defined search parameters; referral parameters based, at least in part, on the accounting professional highlighted accounting professional profile data; referral parameters based, at least in part, on the provider highlighted accounting professional profile data; referral parameters based, at least in part, on the indicated desired number, type, or targeted classification of user leads; referral parameters based, at least in part, on the need to spread recommendations/matches evenly throughout the accounting professionals in the accounting professional database; and/or referral parameters based, at least in part, on any combination of the above, and/or any other accounting professional referral parameters desired/defined by the provider of the process for matching financial management system users with relevantly qualified accounting professionals.

In one embodiment, accounting professionals whose accounting professional profile data matches, or most closely matches, the one or more matching criteria for the user are further analyzed using one or more processors associated with one or more computing systems.

In one embodiment, the selected user relevant accounting professionals to be recommended to the user are presented to the user in a potential accounting professional listing.

In one embodiment, the potential accounting professional listing includes a listing of the recommended user relevant accounting professionals along with data indicating the one or more matching criteria used to identify the recommended user relevant accounting professionals.

In one embodiment, the potential accounting professional listing includes a listing of the recommended user relevant accounting professionals along with data indicating how the one or more matching criteria used to identify the recommended user relevant accounting professionals were determined.

In one embodiment, the potential accounting professional listing includes a listing of the recommended user relevant accounting professionals along with data indicating the percent match of the recommended user relevant accounting professionals with the one or more matching criteria.

In one embodiment, the potential accounting professional listing is generated by one or more processors associated with one or more computing systems and displayed via a user interface display on a display device associated with a user computing system accessible by the user.

In one embodiment, the user is additionally provided the capability to modify, drop, add, or otherwise change, the one or more matching criteria, and/or prioritize the one or more matching criteria. In these instances, once the one or more matching criteria are modified, dropped, added, prioritized, or otherwise changed, a new search of the accounting professional database is conducted using the new, or modified, match criteria.

In one embodiment, the user is provided the capability to select one or more of the recommended user relevant accounting professionals listed in the potential accounting professional listing. In one embodiment, one or more recommended user relevant accounting professionals listed in the potential accounting professional listing are automatically selected by the process for matching financial management system users with relevantly qualified accounting professionals.

In one embodiment, once one or more recommended user relevant accounting professionals are selected from the potential accounting professionals listing, one or more actions are taken to provide communication between the user and the selected recommended user relevant accounting professionals.

In one embodiment, once a recommended user relevant accounting professional is selected, and before contact information for the recommended user relevant accounting professional is provided to the user, the recommended user relevant accounting professional is contacted and provided information about the user's accounting professional needs. In these instances, if the recommended user relevant accounting professional decides they are interested in the user's business, the recommended user relevant accounting professional is either provided direct contact information for the user, and/or the recommended user relevant accounting professional's contact information is provided to the user, thereby matching the recommended user relevant accounting professional to the user and transforming the user status into the status of business lead provided to the recommended user relevant accounting professional.

In one embodiment, once a recommended user relevant accounting professional is selected, and before contact information for the user is provided to the recommended user relevant accounting professional, the recommended user relevant accounting professional is contacted and provided information about the user's accounting professional needs. In these instances, if the recommended user relevant accounting professional decides they are interested in the user's business, the recommended user relevant accounting professional is only then provided direct contact information for the user, and/or the recommended user relevant accounting professional's contact information is provided to the user, thereby matching the recommended user relevant accounting professional to the user and transforming the user status into the status of business lead provided to the recommended user relevant accounting professional.

In one embodiment, the business leads provided to each recommended user relevant accounting professional are monitored and results are tracked to determine the number of successful leads, i.e., leads that result in the services of the recommended user relevant accounting professional being secured by the user.

In one embodiment, any business leads provided to a recommended user relevant accounting professional that do not result in the services of the recommended user relevant accounting professional being secured are identified and an attempt is made to obtain feedback as to why the business lead was not successful from the user and/or the recommended user relevant accounting professional. In various embodiments, any feedback data obtained is used by the process for matching financial management system users with relevantly qualified accounting professionals to make future matches more accurate, i.e., to make the process for matching financial management system users with relevantly qualified accounting professionals a self-learning/correcting process.

Hardware System Architecture

FIG. 1 is a block diagram of an exemplary hardware architecture for implementing one embodiment of a process for matching financial management system users with relevantly qualified accounting professionals, such as exemplary process 200 discussed herein, that includes: a user computing system 100, e.g., a first computing system; an accounting professional system 150, e.g., a second computing system; a process system 120, e.g., a third computing system or server system; a database 170; a communications link 140A, e.g., a first communications link; a communications link 140B, e.g., a second communications link; and communications link 140C, e.g., a third communications link.

As seen in FIG. 1, user computing system 100 typically includes a central processing unit (CPU) 101, a communications interface 105, and a memory system 103.

In one embodiment, memory system 103 includes all, or part of, a process for matching financial management system users with relevantly qualified accounting professionals 200, shown as process 200 in FIG. 1.

In one embodiment, memory system 103 includes all, or part of, a computing system implemented financial management system 102 that includes data, processes, and/or procedures for implementing one or more financial management systems that provide bookkeeping, payroll, inventory, point-of-sale, and various other business related functions and activities.

As noted above, the term "financial management" system includes, but is not limited to, any of the following: computing system implemented, and/or online, business management systems, packages, programs, modules, or applications; computing system implemented, and/or online, business financial management systems, packages, programs, modules, or applications; computing system implemented, and/or online, bookkeeping systems, packages, programs, modules, or applications; computing system implemented, and/or online, payroll systems, packages, programs, modules, or applications; computing system implemented, and/or online, inventory systems, packages, programs, modules, or applications; computing system implemented, and/or online, point-of-sale (POS) systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Specific examples of currently available financial management systems include, but are not limited to: QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken™, available from Intuit, Inc. of Mountain View, Calif.; Quicken On-line™, available from Intuit, Inc. of Mountain View, Calif.; QuickReceipts™ available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management applications discussed herein, and/or known to those of skill in the art at the time of filing, and/or as developed after the time of filing.

In one embodiment, computing system implemented financial management system 102 includes data, processes, and/or procedures for accessing, and/or interfacing, with one or more remote systems, websites, and/or applications, such as on-line financial management system 132, that are provided via remote systems such as provider system 120.

In one embodiment, memory system 103, and process 200, include all, or part of, user need data 104 including data, processes and/or procedures for obtaining and processing data indicating the specific accounting professional needs of a user.

In one embodiment, once a user of a financial management system, such as computing system implemented financial management system 102 and/or on-line financial management system 132, which has an accounting professional need is identified, user need data 104 indicating the specific accounting professional needs of the user is obtained.

In one embodiment, user need data 104 includes, but is not limited to, data indicating one or more of: the location of the user, the user's business, or a preferred location indicated by the user; the financial management system used by the user's business, and/or the version of the financial management system used; the accounting services desired by the user, such as bookkeeping services, point-of-sale services, payroll services, inventory services, financial management system training, financial management system set up, and/or financial management system data transfer; and/or any other specific user need data desired by the provider of process for matching financial management system users with relevantly qualified accounting professionals 200, and/or one or more users, as discussed herein, and/or as known in the art/available at the time of filing, and/or as developed/made available after the time of filing.

In various embodiments, user need data 104 is obtained from the user via a user interface display (not shown) displayed on a display device (not shown) associated with one or more computing systems, such as user computing system 100, and one or more user interface devices (not shown), such as a keyboard, mouse, touchscreen, touchpad, voice-recognition system, or any other device or mechanism for providing user input and converting the user input into computing system instructions and/or actions.

In various embodiments, user need data 104 is obtained by scanning the financial management system data associated with computing system implemented financial management system 102, and/or on-line financial management system 132, and determining potential user accounting professional needs automatically.

In various embodiments, user need data 104 is obtained via one or more websites associated with the financial management system and/or process for matching financial management system users with relevantly qualified accounting professionals 200.

In various embodiments, user need data 104 is determined, and/or obtained, via any of the methods, means, processes, and/or procedures discussed above with respect to identifying users of the financial management system who may need the assistance of an accounting professional, and/or any other method, means, processes, and/or procedures, as discussed herein, and/or as known in the art/available at the time of filing, and/or as developed/made available after the time of filing.

In one embodiment, memory system 103 includes all, or part of, matching results data 129 including data, processes, and/or procedures for, as discussed below, providing the user of user computing system 100 a predefined number of recommended user relevant accounting professionals whose accounting professional profile data matches, or most closely matches, one or more matching criteria for the user and as presented to the user in a potential accounting professional listing.

In one embodiment, the potential accounting professional listing of matching results data 129 includes a listing of the recommended user relevant accounting professionals along with data indicating the one or more matching criteria used to identify the listed recommended user relevant accounting professionals.

In one embodiment, the potential accounting professional listing of matching results data 129 includes a listing of the recommended user relevant accounting professionals along with data indicating how the one or more matching criteria used to identify the listed recommended user relevant accounting professionals were determined.

In one embodiment, the potential accounting professional listing of matching results data 129 includes a listing of the recommended user relevant accounting professionals along with data indicating the percent match of the recommended user relevant accounting professionals' profile data with the one or more matching criteria.

In one embodiment, the potential accounting professional listing of matching results data 129 is generated by one or more processors/processes, such as CPU 121 and matching engine 127, associated with one or more computing systems, such as process system 120, and transferred to user computing system 100 via a communications link, such as communications link 140A.

In one embodiment, user computing system 100 is any computing system discussed herein, and/or as known in the art at the time of filing, and/or as developed after the time of filing that includes components that can execute all, or part, of process for matching financial management system users with relevantly qualified accounting professionals 200 in accordance with at least one of the embodiments as described herein.

Herein the term "computing system" includes, but is not limited to, any computing system known in the art at the time of filing, and/or as developed after the time of filing, such as, but not limited to: a mobile computing system; a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for matching financial management system users with relevantly qualified accounting professionals in accordance with at least one of the embodiments as discussed herein, and/or as known in the art at the time of filing, and/or as developed after the time of filing.

In one embodiment, user computing system 100 is a mobile computing system. Herein, the term "mobile computing system" includes, but is not limited to: a mobile phone; a smart phone; an internet appliance; any SMS capable system; or any other mobile computing system as discussed herein, and/or as known in the art at the time of filing, and/or as developed after the time of filing.

In various embodiments, user computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

In one embodiment, process for matching financial management system users with relevantly qualified accounting professionals 200 is entered, in whole, or in part, into user computing system 100 via an I/O device (not shown), such as from a CD, DVD, floppy disk, portable hard drive, memory stick, download site, or other medium and/or computer program product as defined herein.

As also seen in FIG. 1, accounting professional system 150 typically includes a central processing unit (CPU) 151, a communications interface 155, and a memory system 153. In one embodiment, memory system 153 includes all, or part of, process for matching financial management system users with relevantly qualified accounting professionals 200, shown as process 200 in FIG. 1.

In one embodiment, memory system 153 includes all, or part of, accounting professional profile data 154 that includes data, processes and/or procedures for generating an accounting professional profile for use with process for matching financial management system users with relevantly qualified accounting professionals 200 and process system 120.

In various embodiments, accounting professional system 150 is a representation of multiple accounting professional systems associated with multiple accounting professionals Likewise, in various embodiments, accounting professional profile data 154 is a representation of multiple accounting professional profile data obtained from multiple accounting professionals. In some embodiments, accounting professional profile data 154 is provided directly to provider system 120 and not through an accounting professional system.

Herein, the term "accounting professional" includes, but is not limited to, bookkeepers, payroll specialists, office managers, accountants, certified public accountants, consultants, tax professionals, and/or any other party, or parties, whose services are used to implement, and/or maintain/use, one or more financial management systems, and/or who help a business implement, and/or maintain, financial practices and/or records.

In various embodiments, accounting professional profile data 154 includes, but is not limited to, accounting professional profile data for one or more accounting professionals representing detailed information associated with the accounting professionals such as, but not limited to: the location of the accounting professionals; the financial management systems the accounting professionals are certified to work with, and the various types of certifications associated with accounting professionals; the accounting professionals' experience; consumer reviews associated with the accounting professionals; special qualifications and/or other certifications associated with the accounting professionals; and/or any other accounting professional profile information desired by the provider of process for matching financial management system users with relevantly qualified accounting professionals 200.

In various embodiments, the accounting professionals themselves are provided the capability to prioritize, and/or highlight, desired portions of their accounting professional profile data 154, such as, but not limited to: the specific certifications considered most relevant by the accounting professionals; the special qualifications considered most relevant by the accounting professionals; the location of the accounting professionals; the accounting professionals' experience; or any other accounting professional profile data the accounting professionals wish to have highlighted and/or given more weight. In this way, the accounting professionals themselves can indicate what portions of their accounting professional profile data 154 they feel are most relevant and will lead to the best matches/leads.

In various embodiments, portions of accounting professional profile data 154 are highlighted, and/or weighted, by the provider of process for matching financial management system users with relevantly qualified accounting professionals 200.

In various embodiments, accounting professional profile data 154 includes data provided by the accounting professionals indicating a desired number, type, or targeted classification of, user leads, and/or matches, desired by the accounting professionals.

In one embodiment, accounting professional system 150, and memory 153, also includes lead contact data 157. In one embodiment, once one or more accounting professionals are selected from the potential accounting professionals listing of matching results data 129, as discussed below, one or more actions are taken to provide communication between the user and the selected accounting professionals.

In one embodiment, once an accounting professional is selected, and before contact information for the accounting professional is provided to the user, the accounting professional is contacted and provided information about the user's accounting professional needs. In these instances, if the accounting professional decides they are interested in the user's business, the accounting professional is either provided direct contact information for the user via lead contact data 157, and/or the accounting professional's contact information is provided to the user, thereby matching the accounting professional to the user and transforming the user status into the status of business lead provided to the accounting professional.

In one embodiment, once an accounting professional is selected, and before contact information for the user is provided to the accounting professional, the accounting professional is contacted and provided information about the user's accounting professional needs. In these instances, if the accounting professional decides they are interested in the user's business, the accounting professional is only then provided direct contact information for the user via lead contact data 157, and/or the accounting professional's contact information is provided to the user, thereby matching the accounting professional to the user and transforming the user status into the status of business lead provided to the accounting professional.

In one embodiment, accounting professional system 150 is any computing system discussed herein, and/or as known in the art at the time of filing, and/or as developed after the time of filing that includes components that can execute all, or part, of process for matching financial management system users with relevantly qualified accounting professionals 200 in accordance with at least one of the embodiments as described herein.

In various embodiments, accounting professional system 150 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

As seen in FIG. 1, in one embodiment, process system 120 includes one or more processors, CPU(s) 121, a communication interface 122, and a memory 123.

As seen in FIG. 1, in one embodiment, memory 123 includes all, or part of, process for matching financial management system users with relevantly qualified accounting professionals 200, shown as process 200 in FIG. 1.

In one embodiment, memory system 123 includes all, or part of, user need data 104. In one embodiment, memory system 123 receives all, or part of, user need data 104 from user computing system 100 via communications link 140A.

In one embodiment, memory system 123 receives all, or part of, user need data 104 from user database 170 via communications link 140B.

In one embodiment, memory system 123 includes all, or part of, accounting professional profile data 154. In various embodiments, accounting professional profile data 154 is received from accounting professional system 150, via communications link 140B, and/or database 170, via communications link 140C.

In one embodiment, memory system 123 includes all, or part of, process match criteria data 124. In various embodiments, process match criteria data 124 includes accounting professional referral parameters determined/defined by the provider of process for matching financial management system users with relevantly qualified accounting professionals 200.

In various embodiments, the accounting professional referral parameters defined by the provider of process for matching financial management system users with relevantly qualified accounting professionals 200 of process match criteria data 124 include, but are not limited to, one or more of: data indicating the number of recent matches/leads provided to various ones of the accounting professionals in the accounting professional database; the number of successful matches/leads provided to various ones of the accounting professionals in the accounting professional database; the number, and or quality of, reviews associated with various ones of the accounting professionals in the accounting professional database; the length of time accounting professionals in the accounting professional database have been qualified/certified, and/or the mix of qualifications/certifications associated with the accounting professionals in the accounting professional database; one or more provider defined search parameters; the accounting professional highlighted accounting professional profile data; the provider highlighted accounting professional profile data; the indicated desired number, type, or targeted classification of user leads; the need to spread recommendations/matches evenly throughout the accounting professionals in the accounting professional database; and/or any other accounting professional referral parameters desired/defined by the provider of process for matching financial management system users with relevantly qualified accounting professionals 200.

In one embodiment, user need data 104, and/or accounting professional profile data 154, and/or process match criteria data 124, are used to define/determine matching criteria represented by matching criteria data 125.

In one embodiment, the one or more matching criteria of matching criteria data 125, and/or user need data 104, and/or the accounting professional referral parameters defined by the provider of process for matching financial management system users with relevantly qualified accounting professionals 200 of process match criteria data 124, are provided to matching engine 127 where the data is used to search accounting professional profile data 154 to find one or more accounting professionals that match, or most closely match, the one or more matching criteria for the user of matching criteria data 125.

In one embodiment, a predefined number of accounting professionals whose accounting professional profile data matches, or most closely matches, the one or more matching criteria for the user are presented to the user in a potential accounting professional listing as part of matching results data 129.

In various embodiments, process system 120 is any computing system discussed herein, and/or as known in the art at the time of filing, and/or as developed after the time of filing that includes components that can execute all, or part, of process for matching financial management system users with relevantly qualified accounting professionals 200, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function.

As discussed in more detail below, in one embodiment, database 170 is under the control of a process for matching financial management system users with relevantly qualified accounting professionals, such as exemplary process 200, and includes all, or part of, user need data 104, and/or accounting professional profile data 154.

In one embodiment, database 170 is a dedicated accounting professional database.

In various embodiments, computing systems 100 and 150, and database 170, are linked to process system 120 via communications channels 140A, 140B, and 140C, respectively. In various embodiments, any, or all, of communications channels 140A, 140B, and 140C can be, but are not limited to: a mobile communication link, such as a mobile phone link; a land-line phone link; a cable-based communications link; a satellite communications link; the Internet, or other network communications link; and/or any other communications link, or combination of communications links, as discussed herein, and/or as known in the art at the time of filing, and/or as developed after the time of filing.

In various embodiments, any, or all, of communications channels 140A, 140B, and 140C, are any SMS communication link as discussed herein, and/or as known in the art at the time of filing, and/or as developed after the time of filing. Short Message Service (SMS) is the text communication service component of phone, web, or mobile communication systems. SMS uses relatively ridged standardized communications protocols that allow the exchange of only very short text messages between fixed line or mobile phone devices in "SMS format".

In various embodiments any, or all, of communications channels 140A, 140B, and 140C include any network or network system that is of interest to a consumer such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In one embodiment, computing systems 100 and 150, database 170, process system 120, and any, or all, of communications channels 140A, 140B, and 140C, are part of a cloud computing environment.

Those of skill in the art will readily recognize that the components shown in FIG. 1 and their respective sub-components, are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100, 150, database 170, and process system 120 are not relevant.

Although a process for matching financial management system users with relevantly qualified accounting professionals, such as process for matching financial management system users with relevantly qualified accounting professionals 200, is sometimes referred to herein, alternatively, as a process, an application, a module, a program, a component of a software system, a component of a software package, a component of a parent system, a plug-in, or a feature of a parent system, this terminology is illustrative only. In some embodiments, a process for matching financial management system users with relevantly qualified accounting professionals, such as process for matching financial management system users with relevantly qualified accounting professionals 200, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPU(s) 101, 151, and/or 121.

In one embodiment, a process for matching financial management system users with relevantly qualified accounting professionals, such as process for matching financial management system users with relevantly qualified accounting professionals 200, is a computer application or process implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system, such as computing systems 100, 120, and 150 of FIG. 1, described above. However, in some embodiments, the medium also may be removable and/or remote from the computing system.

Process

In accordance with one embodiment, a method and system for matching financial management system users with relevantly qualified accounting professionals includes a process for matching financial management system users with relevantly qualified accounting professionals whereby, in one embodiment, an accounting professional database is created that includes accounting professional profile data for one or more accounting professionals associated with, and/or certified with, one or more financial management systems. In various embodiments, the accounting professional profile data includes data representing detailed information associated with the accounting professionals.

In one embodiment, a user of one or more financial management systems who may need the assistance of an accounting professional is identified and user need data indicating the detailed and specific accounting professional needs of the user is obtained.

In one embodiment, one or more matching criteria for the user are determined/identified based, at least in part, on the user need data.

In one embodiment, the one or more matching criteria for the user are then used to search the accounting professional profile data in the accounting professional database to find one or more accounting professionals that match, or most closely match, the one or more matching criteria for the user.

In one embodiment, accounting professionals whose accounting professional profile data matches, or most closely matches, the one or more matching criteria for the user are further analyzed using one or more accounting professional referral parameters defined by the provider of the process for matching financial management system users with relevantly qualified accounting professionals to select a predefined number of user relevant accounting professionals to be recommended to the user in a potential accounting professional listing.

In one embodiment, one or more recommended user relevant accounting professionals are selected from the potential accounting professionals listing and then one or more actions are taken to provide communication between the user and the selected recommended user relevant accounting professionals.

Figure 2:
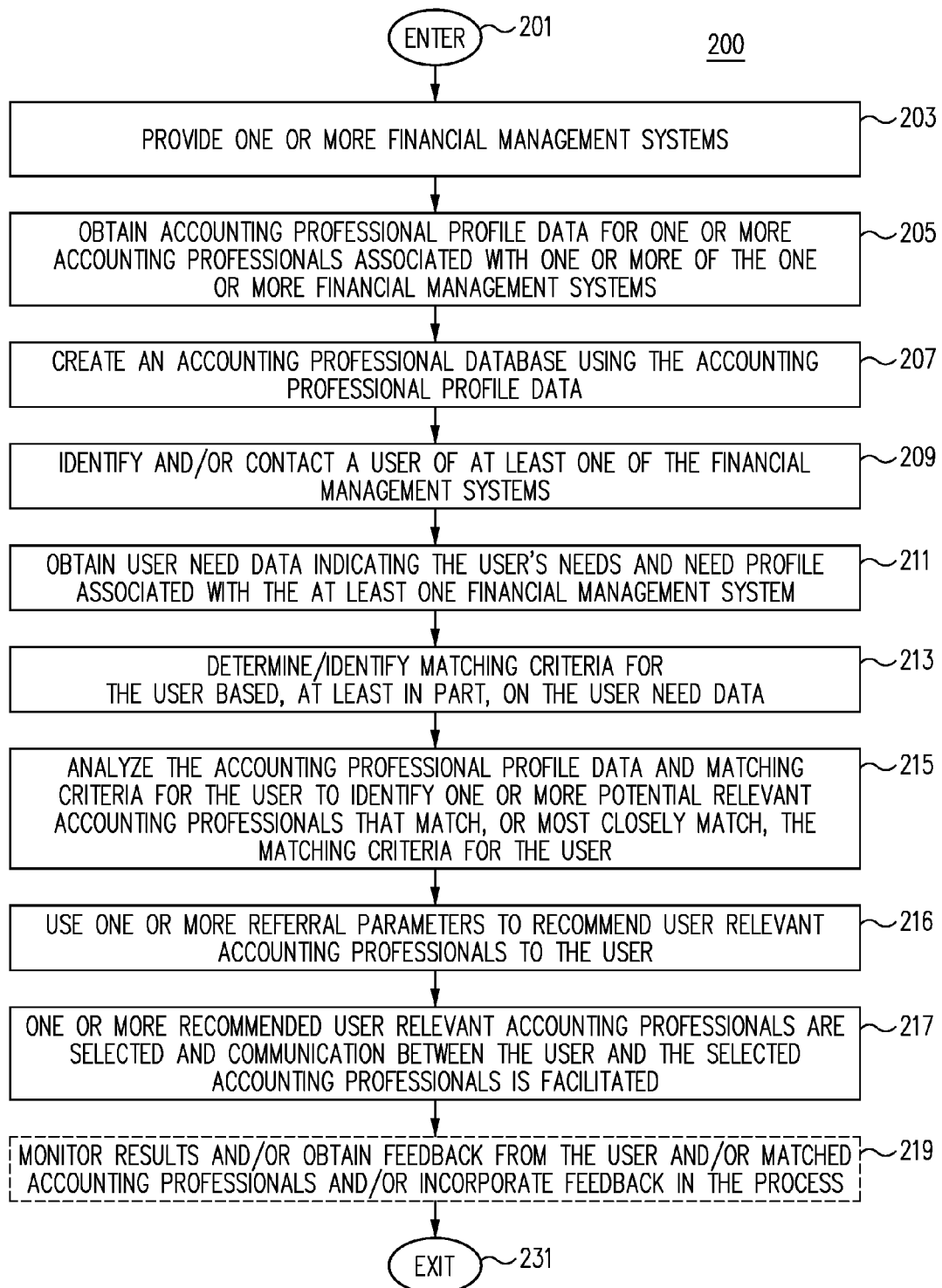
FIG. 2 is a flow chart depicting a process for matching financial management system users with relevantly qualified accounting professionals in accordance with one embodiment.

FIG. 2 a flow chart depicting a process for matching financial management system users with relevantly qualified accounting professionals 200 in accordance with one embodiment. Process for matching financial management system users with relevantly qualified accounting professionals 200 begins at ENTER OPERATION 201 of FIG. 2 and process flow proceeds to PROVIDE ONE OR MORE FINANCIAL MANAGEMENT SYSTEMS OPERATION 203.

In one embodiment, at least part of process for matching financial management system users with relevantly qualified accounting professionals 200 is implemented on a user computing system, and/or a user mobile computing system, such as user computing system 100 of FIG. 1.

Herein the term "computing system" includes, but is not limited to, any computing system known in the art at the time of filing, and/or as developed after the time of filing, such as, but not limited to: a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for matching financial management system users with relevantly qualified accounting professionals in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

Returning to FIG. 1, in one embodiment, at least part of process for matching financial management system users with relevantly qualified accounting professionals 200 is, or is associated with, one or more applications and/or data management systems implemented on one or more computing systems.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, mobile applications, data management systems, operating systems, interface systems, and/or financial management systems.

In various embodiments, process for matching financial management system users with relevantly qualified accounting professionals 200 is a "stand alone" system, package, program, module, or application.

In one embodiment, at PROVIDE ONE OR MORE FINANCIAL MANAGEMENT SYSTEMS OPERATION 203, a financial management system is provided that is a parent system for, or is otherwise associated with, process for matching financial management system users with relevantly qualified accounting professionals 200.

In one embodiment, at PROVIDE ONE OR MORE FINANCIAL MANAGEMENT SYSTEMS OPERATION 203, a financial management system, such as computing system implemented financial management system 102, and/or on-line financial management system 132 of FIG. 1, is provided.

In one embodiment, the term "financial management" system includes, but is not limited to, any of the following: computing system implemented, and/or online, business management systems, packages, programs, modules, or applications; computing system implemented, and/or online, business financial management systems, packages, programs, modules, or applications; computing system implemented, and/or online, bookkeeping systems, packages, programs, modules, or applications; computing system implemented, and/or online, payroll systems, packages, programs, modules, or applications; computing system implemented, and/or online, inventory systems, packages, programs, modules, or applications; computing system implemented, and/or online, point-of-sale (POS) systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Specific examples of currently available financial management systems include, but are not limited to: QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken™, available from Intuit, Inc. of Mountain View, Calif.; Quicken On-line™, available from Intuit, Inc. of Mountain View, Calif.; QuickReceipts™ available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management applications discussed herein, and/or known to those of skill in the art at the time of filing, and/or as developed after the time of filing.

Returning to FIG. 2, in one embodiment, once a financial management system is provided at PROVIDE ONE OR MORE FINANCIAL MANAGEMENT SYSTEMS OPERATION 203, process flow proceeds to OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205.

In one embodiment, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 accounting professional profile data for one or more accounting professionals certified by/with, and/or qualified by/with, and/or associated with the financial management system of PROVIDE ONE OR MORE FINANCIAL MANAGEMENT SYSTEMS OPERATION 203 is obtained.

Herein, the term "accounting professional" includes, but is not limited to, bookkeepers, payroll specialists, office managers, accountants, certified public accountants, consultants, tax professionals, and/or any other party, or parties, whose services are used to implement, and/or maintain/use, one or more financial management systems, and/or who help a business implement, and/or maintain, financial practices and/or records.

In one embodiment, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professional profile data for one or more accounting professionals is obtained from the accounting professionals directly.

In one embodiment, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professional profile data for one or more accounting professionals is obtained from the accounting professional through the financial management system of PROVIDE ONE OR MORE FINANCIAL MANAGEMENT SYSTEMS OPERATION 203.

In one embodiment, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professional profile data for one or more accounting professionals is obtained from a third party and/or an accounting professional database.

In various embodiments, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professional profile data for one or more accounting professionals is obtained from any source of accounting professional profile data, and by any means, as discussed herein, and/or as known in the art/available at the time of filing, and/or as developed/made available after the time of filing.

In one embodiment, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professional profile data for one or more accounting professionals includes detailed information associated with the accounting professionals such as, but not limited to: the location of the accounting professionals, their offices, and/or service locations; the financial management systems the accounting professionals are certified to work with, and the various types of certifications associated with accounting professionals; the accounting professionals' experience; consumer reviews associated with the accounting professionals; special qualifications and/or other certifications associated with the accounting professionals; and/or any other accounting professional profile information desired by the provider of process for matching financial management system users with relevantly qualified accounting professionals 200.

In various embodiments, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professionals themselves are provided the capability to prioritize, and/or highlight, desired portions of their accounting professional profile data, such as, but not limited to: the specific certifications considered most relevant by the accounting professionals; the special qualifications considered most relevant by the accounting professionals; the location of the accounting professionals; the accounting professionals' experience; or any other accounting professional profile data the accounting professionals wish to have highlighted and/or given more weight. In this way, the accounting professionals themselves can indicate what portions of their accounting professional profile data they feel are most relevant and will lead to the best matches/leads.

In various embodiments, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 portions of the accounting professional profile data are highlighted, and/ or weighted, by the provider of process for matching financial management system users with relevantly qualified accounting professionals 200.

In various embodiments, at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 the accounting professionals are also provided the opportunity to indicate a number, type, or targeted classification of, user leads, and/or matches, desired by the accounting professionals.

In one embodiment, once the accounting professional profile data for one or more accounting professionals is obtained at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205, process flow proceeds to CREATE AN ACCOUNTING PROFESSIONAL DATABASE USING THE ACCOUNTING PROFESSIONAL PROFILE DATA OPERATION 207.

In one embodiment, at CREATE AN ACCOUNTING PROFESSIONAL DATABASE USING THE ACCOUNTING PROFESSIONAL PROFILE DATA OPERATION 207 an accounting professional database is created using the accounting professional profile data for one or more accounting professionals obtained at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205.

Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In various embodiments, at CREATE AN ACCOUNTING PROFESSIONAL DATABASE USING THE ACCOUNTING PROFESSIONAL PROFILE DATA OPERATION 207 the accounting professional profile data is correlated and stored in the accounting professional database based on, but not limited to: one or more provider defined search parameters; the accounting professional highlighted accounting professional profile data; and/or the provider highlighted accounting professional profile data, and or the accounting professional indicated desired number, type, or targeted classification of user leads.

In one embodiment, once an accounting professional database is created using the accounting professional profile data for one or more accounting professionals obtained at OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 at CREATE AN ACCOUNTING PROFESSIONAL DATABASE USING THE ACCOUNTING PROFESSIONAL PROFILE DATA OPERATION 207, process flow proceeds to IDENTIFY AND/OR CONTACT A USER OF AT LEAST ONE OF THE FINANCIAL MANAGEMENT SYSTEMS OPERATION 209.

In one embodiment, at IDENTIFY AND/OR CONTACT A USER OF AT LEAST ONE OF THE FINANCIAL MANAGEMENT SYSTEMS OPERATION 209 a user of the financial management system of PROVIDE ONE OR MORE FINANCIAL MANAGEMENT SYSTEMS OPERATION 203 who may need the assistance of an accounting professional is identified.

In one embodiment, the terms "user" and "user of a financial management system" include, but are not limited to, business owners, business managers, and/or any other party or parties designated by a business/business owner to manage all or part of the financial affairs of the business and/or to use, or otherwise interface, with one or more financial management systems used by the business.

In various embodiments, the user of the financial management system who may need the assistance of an accounting professional is identified at IDENTIFY AND/OR CONTACT A USER OF AT LEAST ONE OF THE FINANCIAL MANAGEMENT SYSTEMS OPERATION 209 through relatively passive means initiated by the user such as, but not limited to, the user signing up for process for matching financial management system users with relevantly qualified accounting professionals 200 through an offer or data entry field provided through the financial management system of PROVIDE ONE OR MORE FINANCIAL MANAGEMENT SYSTEMS OPERATION 203, and/or the user signing up for process for matching financial management system users with relevantly qualified accounting professionals 200 through a website associated with the financial management system of PROVIDE ONE OR MORE FINANCIAL MANAGEMENT SYSTEMS OPERATION 203, and/or any other method, means, process, or procedure whereby a user can initiate signing up for, and/or identifying themselves, to process for matching financial management system users with relevantly qualified accounting professionals 200.

In various embodiments, the user of the financial management system who may need the assistance of an accounting professional is identified at IDENTIFY AND/OR CONTACT A USER OF AT LEAST ONE OF THE FINANCIAL MANAGEMENT SYSTEMS OPERATION 209 through relatively active means initiated by the provider of the financial management system of PROVIDE ONE OR MORE FINANCIAL MANAGEMENT SYSTEMS OPERATION 203, and/or process for matching financial management system users with relevantly qualified accounting professionals 200, such as, but not limited to: obtaining contact information for the user at the time the user implements the financial management system of PROVIDE ONE OR MORE FINANCIAL MANAGEMENT SYSTEMS OPERATION 203 and sending the user an e-mail, Short Message Service (SMS), or other text message, asking the user if the user has any accounting professional needs; obtaining contact information for the user at the time the user implements the financial management system of PROVIDE ONE OR MORE FINANCIAL MANAGEMENT SYSTEMS OPERATION 203 and sending the user a letter, FAX, or other printed media asking the user if the user has any accounting professional needs; obtaining telephone contact information for the user at the time the user implements the financial management system of PROVIDE ONE OR MORE FINANCIAL MANAGEMENT SYSTEMS OPERATION 203 and asking the user if the user has any accounting professional needs; and/or any other method, means, process, or procedure whereby a provider can initiate signing a user up for, and/or identifying user to, process for matching financial management system users with relevantly qualified accounting professionals 200.

In various embodiments, the user of the financial management system who may need the assistance of an accounting professional is identified at IDENTIFY AND/OR CONTACT A USER OF AT LEAST ONE OF THE FINANCIAL MANAGEMENT SYSTEMS OPERATION 209 through relatively automated means initiated by the provider of the financial management system of PROVIDE ONE OR MORE FINANCIAL MANAGEMENT SYSTEMS OPERATION 203, and/or process for matching financial management system users with relevantly qualified accounting professionals 200, such as, but not limited to, obtaining user permission to scan the user's financial data entered into the financial management system of PROVIDE ONE OR MORE FINANCIAL MANAGEMENT SYSTEMS OPERATION 203 and then scanning the data for indications that the user may need the assistance of one or more accounting professionals.

In various embodiments, the user of the financial management system who may need the assistance of an accounting professional is identified at IDENTIFY AND/OR CONTACT A USER OF AT LEAST ONE OF THE FINANCIAL MANAGEMENT SYSTEMS OPERATION 209 by any means, mechanism, process, and/or procedure for identifying a user who may need the assistance of an accounting professional as discussed herein, and/or as known in the art/available at the time of filing, and/or as developed/made available after the time of filing.

In one embodiment, once a user of the financial management system of PROVIDE ONE OR MORE FINANCIAL MANAGEMENT SYSTEMS OPERATION 203 who may need the assistance of an accounting professional is identified at IDENTIFY AND/OR CONTACT A USER OF AT LEAST ONE OF THE FINANCIAL MANAGEMENT SYSTEMS OPERATION 209, process flow proceeds to OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211.

In one embodiment, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 user need data indicating the specific accounting professional needs of the user identified at IDENTIFY AND/OR CONTACT A USER OF AT LEAST ONE OF THE FINANCIAL MANAGEMENT SYSTEMS OPERATION 209 is obtained.

In one embodiment, the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 includes, but is not limited to, data indicating one or more of: the location of the user, the user's business, or a preferred location indicated by the user; the financial management system used by the user's business, and/or the version of the financial management system used; the accounting services desired by the user, such as bookkeeping services, point-of-sale services, payroll services, inventory services, financial management system training, financial management system set up, and/or financial management system data transfer; and/or any other specific user need data desired by the provider of process for matching financial management system users with relevantly qualified accounting professionals 200, and/or one or more users, as discussed herein, and/or as known in the art/available at the time of filing, and/or as developed/made available after the time of filing.

In various embodiments, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user need data is obtained from the user via a user interface display displayed on a display device associated with one or more computing systems, such as user computing system 100 of FIG. 1, and one or more user interface devices, such as a keyboard, mouse, touchscreen, touchpad, voice-recognition system, or any other device or mechanism for providing user input and converting the user input into computing system instructions and/or actions.

Returning to FIG. 2, in various embodiments, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user need data is obtained by scanning the financial management system data associated with the financial management system of PROVIDE ONE OR MORE FINANCIAL MANAGEMENT SYSTEMS OPERATION 203 and determining potential user accounting professional needs automatically.

In various embodiments, the user need data is obtained at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 via one or more web sites associated with the financial management system of PROVIDE ONE OR MORE FINANCIAL MANAGEMENT SYSTEMS OPERATION 203 and/or process for matching financial management system users with relevantly qualified accounting professionals 200.

In various embodiments, the user need data is determined, and/or obtained, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 via any of the methods, means, processes, and/or procedures discussed above with respect to identifying users of the financial management system who may need the assistance of an accounting professional of IDENTIFY AND/OR CONTACT A USER OF AT LEAST ONE OF THE FINANCIAL MANAGEMENT SYSTEMS OPERATION 209, and/or any other method, means, processes, and/or procedures, as discussed herein, and/or as known in the art/available at the time of filing, and/or as developed/made available after the time of filing.

In various embodiments, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user is provided the capability to review, and/or edit, the user need data.

In various embodiments, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user is provided the capability to prioritize portions of the user need data which the user feels are particularly relevant to finding a relevant accounting professional and matching that accounting professional with the user.

For instance, in one specific illustrative example, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user can indicate that a user specified location being associated with an accounting professional, or within a specified radius, is more, or less, important, than the particular certification associated with an accounting professional.

In various embodiments, at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 the user can assign a priority to each piece of information associated with the user need data. In this way, in one embodiment, the user can customize the filters used to match one or more accounting professionals to the user's needs.

In one embodiment, once user need data indicating the specific accounting professional needs of the user identified at IDENTIFY AND/OR CONTACT A USER OF AT LEAST ONE OF THE FINANCIAL MANAGEMENT SYSTEMS OPERATION 209 is obtained at OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211, process flow proceeds to DETERMINE/IDENTIFY MATCHING CRITERIA FOR THE USER BASED, AT LEAST IN PART, ON THE USER NEED DATA OPERATION 213.

In one embodiment, at DETERMINE/IDENTIFY MATCHING CRITERIA FOR THE USER BASED, AT LEAST IN PART, ON THE USER NEED DATA OPERATION 213 one or more matching criteria for the user are determined/identified using the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211.

In one embodiment, the one or more matching criteria for the user of DETERMINE/IDENTIFY MATCHING CRITERIA FOR THE USER BASED, AT LEAST IN PART, ON THE USER NEED DATA OPERATION 213 can include, but are not limited to: matching criteria based on the location of the user, the user's business, or a preferred location indicated by the user; matching criteria based on the financial management system, or financial management system version, used by the user's business, and/or features of the financial management system used; matching criteria based on the accounting services desired by the user, such as bookkeeping services, point-of-sale services, payroll services, inventory services, financial management system training, financial management system set up, and/or financial management system data transfer; and/or any other matching criteria based on any parameters/desires of the provider of the process for matching financial management system users with relevantly qualified accounting professionals, and/or one or more users.

In various embodiments, at DETERMINE/IDENTIFY MATCHING CRITERIA FOR THE USER BASED, AT LEAST IN PART, ON THE USER NEED DATA OPERATION 213 the one or more matching criteria for the user are determined/identified under the direction of one or more processors, such as CPU(s) 101 and/or 121 and/or 151 of FIG. 1, associated with one or more computing systems, such user computing system 100, accounting professional system 150, and/or process system 120 of FIG. 1.

Returning to FIG. 2, in various embodiments, the one or more matching criteria for the user of DETERMINE/IDENTIFY MATCHING CRITERIA FOR THE USER BASED, AT LEAST IN PART, ON THE USER NEED DATA OPERATION 213 are presented to the user for review, editing, prioritization, and/or approval.

In one embodiment, the one or more matching criteria for the user of DETERMINE/IDENTIFY MATCHING CRITERIA FOR THE USER BASED, AT LEAST IN PART, ON THE USER NEED DATA OPERATION 213, and/or the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211, are stored/saved in any database or any computing system, as discussed herein, and/or as known in the art/available at the time of filing, and/or as developed/made available after the time of filing.

As noted above, herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

For instance, in one embodiment, the data is saved/stored in whole, or in part, in a memory system, such as memories 103, 153, and/or 123 of FIG. 1, or in a cache memory, or in any main memory or mass memory, associated with any computing system, such as computing systems 100, 150 and/or 120 of FIG. 1, and/or as discussed herein, and/or as known/available in the art at the time of filing, and/or as developed/made available after the time of filing.

In one embodiment, the data, in whole, or in part, is stored in any computing system and/or server system, or other device, in another location, or on/in a computer readable medium, and/or any other computer program product, as defined herein. In one embodiment, the data, in whole, or in part, is stored on a webpage, in a web-based system, or on a public network such as the Internet.

Returning to FIG. 2, in some embodiments, the data, stored as described above, is maintained, in whole, or in part, by: process for matching financial management system users with relevantly qualified accounting professionals 200, and/or a provider of process for matching financial management system users with relevantly qualified accounting professionals 200; a data management system, and/or a provider of a data management system; a financial management system, and/or a provider of a financial management system; a third party data storage institution; any third party service or institution; and/or any other parties. In some of these embodiments, access to the data is then provided to the process for matching financial management system users with relevantly qualified accounting professionals by providing access to the data and/or providing the data on a computer program product.

In one embodiment, once one or more matching criteria for the user are determined/identified using the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211 at DETERMINE/IDENTIFY MATCHING CRITERIA FOR THE USER BASED, AT LEAST IN PART, ON THE USER NEED DATA OPERATION 213, process flow proceeds to ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215.

In one embodiment, at ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215 the one or more matching criteria for the user of DETERMINE/IDENTIFY MATCHING CRITERIA FOR THE USER BASED, AT LEAST IN PART, ON THE USER NEED DATA OPERATION 213, and/or the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211, is/are used to search the accounting professional profile data of OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 in the accounting professional database of CREATE AN ACCOUNTING PROFESSIONAL DATABASE USING THE ACCOUNTING PROFESSIONAL PROFILE DATA OPERATION 207 to find one or more accounting professionals that match, or most closely match, the one or more matching criteria for the user.

In one embodiment, at ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215 one or more accounting professionals whose accounting professional profile data matches, or most closely matches, the one or more matching criteria for the user are identified.

In one embodiment, once the one or more matching criteria for the user of DETERMINE/IDENTIFY MATCHING CRITERIA FOR THE USER BASED, AT LEAST IN PART, ON THE USER NEED DATA OPERATION 213, and/or the user need data of OBTAIN USER NEED DATA INDICATING THE USER'S NEEDS AND NEED PROFILE ASSOCIATED WITH THE AT LEAST ONE FINANCIAL MANAGEMENT SYSTEM OPERATION 211, is/are used to search the accounting professional profile data of OBTAIN ACCOUNTING PROFESSIONAL PROFILE DATA FOR ONE OR MORE ACCOUNTING PROFESSIONALS ASSOCIATED WITH ONE OR MORE OF THE ONE OR MORE FINANCIAL MANAGEMENT SYSTEMS OPERATION 205 in the accounting professional database of CREATE AN ACCOUNTING PROFESSIONAL DATABASE USING THE ACCOUNTING PROFESSIONAL PROFILE DATA OPERATION 207 to find one or more accounting professionals that match, or most closely match, the one or more matching criteria for the user at ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215, process flow proceeds to USE ONE OR MORE REFERRAL PARAMETERS TO RECOMMEND USER RELEVANT ACCOUNTING PROFESSIONALS TO THE USER OPERATION 216.

In one embodiment, at USE ONE OR MORE REFERRAL PARAMETERS TO RECOMMEND USER RELEVANT ACCOUNTING PROFESSIONALS TO THE USER OPERATION 216 accounting professionals whose accounting professional profile data matches, or most closely matches, the one or more matching criteria for the user of ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215 are further analyzed using one or more accounting professional referral parameters defined by the provider of process for matching financial management system users with relevantly qualified accounting professionals 200 to select a predefined number of user relevant accounting professionals to be recommended to the user in a potential accounting professional listing.

In various embodiments, the accounting professional referral parameters defined by the provider of process for matching financial management system users with relevantly qualified accounting professionals 200 of USE ONE OR MORE REFERRAL PARAMETERS TO RECOMMEND USER RELEVANT ACCOUNTING PROFESSIONALS TO THE USER OPERATION 216 include, but are not limited to, one or more of: referral parameters based, at least in part, on data indicating the number of recent matches/leads provided to specific accounting professionals in the accounting professional database; referral parameters based, at least in part, on the number of matches/leads recently provided to the accounting professionals in the accounting professional database having the same certification and/or qualifications; referral parameters based, at least in part, on the number of successful matches/leads recently provided to specific accounting professionals in the accounting professional database; referral parameters based, at least in part, on the number of successful matches/leads recently provided to accounting professionals in the accounting professional database having the same certification and/or qualifications; referral parameters based, at least in part, on the number, and or quality of, reviews associated with specific accounting professionals in the accounting professional database; referral parameters based, at least in part, on the length of time specific accounting professionals in the accounting professional database have been qualified/certified at a given level, and/or the mix of qualifications/certifications associated with the specific accounting professionals; referral parameters based, at least in part, on one or more provider defined search parameters; referral parameters based, at least in part, on the accounting professional highlighted accounting professional profile data; referral parameters based, at least in part, on the provider highlighted accounting professional profile data; referral parameters based, at least in part, on the indicated desired number, type, or targeted classification of user leads; referral parameters based, at least in part, on the need to spread recommendations/matches evenly throughout the accounting professionals in the accounting professional database; and/or referral parameters based, at least in part, on any combination of the above, and/or any other accounting professional referral parameters desired/defined by the provider of the process for matching financial management system users with relevantly qualified accounting professionals.

In one embodiment, accounting professionals whose accounting professional profile data matches, or most closely matches, the one or more matching criteria for the user are further analyzed at USE ONE OR MORE REFERRAL PARAMETERS TO RECOMMEND USER RELEVANT ACCOUNTING PROFESSIONALS TO THE USER OPERATION 216 using one or more processors, such as CPU(s) 101 and/or 121 and/or 151 of FIG. 1, associated with one or more computing systems, such user computing system 100, accounting professional system 150, and/or process system 120 of FIG. 1.

Returning to FIG. 2, in one embodiment, at USE ONE OR MORE REFERRAL PARAMETERS TO RECOMMEND USER RELEVANT ACCOUNTING PROFESSIONALS TO THE USER OPERATION 216 the selected user relevant accounting professionals to be recommended to the user are presented to the user in a potential accounting professional listing.

In one embodiment, the potential accounting professional listing of USE ONE OR MORE REFERRAL PARAM- ETERS TO RECOMMEND USER RELEVANT ACCOUNTING PROFESSIONALS TO THE USER OPERATION 216 includes a listing of the recommended user relevant accounting professionals along with data indicating the one or more matching criteria used to identify the recommended user relevant accounting professionals.

In one embodiment, the potential accounting professional listing of USE ONE OR MORE REFERRAL PARAMETERS TO RECOMMEND USER RELEVANT ACCOUNTING PROFESSIONALS TO THE USER OPERATION 216 includes a listing of the recommended user relevant accounting professionals along with data indicating how the one or more matching criteria used to identify the recommended user relevant accounting professionals were determined.

In one embodiment, the potential accounting professional listing of USE ONE OR MORE REFERRAL PARAMETERS TO RECOMMEND USER RELEVANT ACCOUNTING PROFESSIONALS TO THE USER OPERATION 216 includes a listing of the recommended user relevant accounting professionals along with data indicating the percent match of the recommended user relevant accounting professionals with the one or more matching criteria.

In one embodiment, the potential accounting professional listing of USE ONE OR MORE REFERRAL PARAMETERS TO RECOMMEND USER RELEVANT ACCOUNTING PROFESSIONALS TO THE USER OPERATION 216 is generated by one or more processors, such as CPU(s) 101 and/or 121 and/or 151 of FIG. 1, associated with one or more computing systems, such user computing system 100, accounting professional system 150, and/or process system 120 of FIG. 1.

Returning to FIG. 2, in one embodiment, at USE ONE OR MORE REFERRAL PARAMETERS TO RECOMMEND USER RELEVANT ACCOUNTING PROFESSIONALS TO THE USER OPERATION 216 the user is additionally provided the capability to modify, drop, add, or otherwise change, the one or more matching criteria, and/or prioritize the one or more matching criteria. In these instances, once the one or more matching criteria are modified, dropped, added, prioritized, or otherwise changed, a new search of the accounting professional database is conducted using the new, or modified, match criteria.

In one embodiment, once accounting professionals whose accounting professional profile data matches, or most closely matches, the one or more matching criteria for the user of ANALYZE THE ACCOUNTING PROFESSIONAL PROFILE DATA AND MATCHING CRITERIA FOR THE USER TO IDENTIFY ONE OR MORE POTENTIAL RELEVANT ACCOUNTING PROFESSIONALS THAT MATCH, OR MOST CLOSELY MATCH, THE MATCHING CRITERIA FOR THE USER OPERATION 215 are further analyzed using one or more accounting professional referral parameters defined by the provider of process for matching financial management system users with relevantly qualified accounting professionals 200 to select a predefined number of user relevant accounting professionals to be recommended to the user in a potential accounting professional listing at USE ONE OR MORE REFERRAL PARAMETERS TO RECOMMEND USER RELEVANT ACCOUNTING PROFESSIONALS TO THE USER OPERATION 216, process flow proceeds to ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 one or more of the recommended user relevant accounting professionals listed in the potential accounting professional listing of USE ONE OR MORE REFERRAL PARAMETERS TO RECOMMEND USER RELEVANT ACCOUNTING PROFESSIONALS TO THE USER OPERATION 216 are selected and one or more actions are taken to provide communication between the user and the selected recommended user relevant accounting professionals.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 the user is provided the capability to select one or more of the recommended user relevant accounting professionals listed in the potential accounting professional listing of USE ONE OR MORE REFERRAL PARAMETERS TO RECOMMEND USER RELEVANT ACCOUNTING PROFESSIONALS TO THE USER OPERATION 216.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 one or more recommended user relevant accounting professionals listed in the potential accounting professional listing are semi-automatically selected by process for matching financial management system users with relevantly qualified accounting professionals 200 upon user request.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 one or more recommended user relevant accounting professionals listed in the potential accounting professional listing are automatically selected by process for matching financial management system users with relevantly qualified accounting professionals 200.

In one embodiment, once one or more recommended user relevant accounting professionals are selected from the potential accounting professionals listing, one or more actions are taken to provide communication between the user and the selected recommended user relevant accounting professionals.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 once a recommended user relevant accounting professional is selected, and before contact information for the recommended user relevant accounting professional is provided to the user, the recommended user relevant accounting professional is contacted and provided information about the user's accounting professional needs via e-mail, Short Message Service (SMS), or other text message.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 once a recommended user relevant accounting professional is selected, and before contact information for the recommended user relevant accounting professional is provided to the user, the recommended user relevant accounting professional is contacted and provided information about the user's accounting professional needs. In these instances, if the recommended user relevant accounting professional decides they are interested in the user's business, the recommended user relevant accounting professional is either provided direct contact information for the user, and/or the recommended user relevant accounting professional's contact information is provided to the user, thereby matching the recommended user relevant accounting professional to the user and transforming the user status into the status of business lead provided to the recommended user relevant accounting professional.

In one embodiment, at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 once a recommended user relevant accounting professional is selected, and before contact information for the user is provided to the recommended user relevant accounting professional, the recommended user relevant accounting professional is contacted and provided information about the user's accounting professional needs. In these instances, if the recommended user relevant accounting professional decides they are interested in the user's business, the recommended user relevant accounting professional is only then provided direct contact information for the user, and/or the recommended user relevant accounting professional's contact information is provided to the user, thereby matching the recommended user relevant accounting professional to the user and transforming the user status into the status of business lead provided to the recommended user relevant accounting professional.

In one embodiment, once one or more of the recommended user relevant accounting professionals listed in the potential accounting professional listing of USE ONE OR MORE REFERRAL PARAMETERS TO RECOMMEND USER RELEVANT ACCOUNTING PROFESSIONALS TO THE USER OPERATION 216 are selected and one or more actions are taken to provide communication between the user and the selected recommended user relevant accounting professionals at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217, process flow optionally proceeds to optional MONITOR RESULTS AND/OR OBTAIN FEEDBACK FROM THE USER AND/OR MATCHED ACCOUNTING PROFESSIONALS AND/OR INCORPORATE FEEDBACK IN THE PROCESS OPERATION 219.

In one embodiment, at optional operation MONITOR RESULTS AND/OR OBTAIN FEEDBACK FROM THE USER AND/OR MATCHED ACCOUNTING PROFESSIONALS AND/OR INCORPORATE FEEDBACK IN THE PROCESS OPERATION 219 the business leads provided to each accounting professional at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 are monitored and results are tracked to determine the number of successful leads, i.e., leads that result in the services of the accounting professional being secured by the user.

In one embodiment, at MONITOR RESULTS AND/OR OBTAIN FEEDBACK FROM THE USER AND/OR MATCHED ACCOUNTING PROFESSIONALS AND/OR INCORPORATE FEEDBACK IN THE PROCESS OPERATION 219 any business leads provided to an accounting professional that do not result in the services of the accounting professional being secured are identified and an attempt is made to obtain feedback as to why the business lead was not successful from the user and/or the selected accounting professional.

In various embodiments, at MONITOR RESULTS AND/OR OBTAIN FEEDBACK FROM THE USER AND/OR MATCHED ACCOUNTING PROFESSIONALS AND/OR INCORPORATE FEEDBACK IN THE PROCESS OPERATION 219 any feedback data obtained is used by the provider of process for matching financial management system users with relevantly qualified accounting professionals 200 to make future matches more accurate, i.e., to make process for matching financial management system users with relevantly qualified accounting professionals 200 a self-learning/correcting process.

In one embodiment, once the business leads provided to each accounting professional at ONE OR MORE RECOMMENDED USER RELEVANT ACCOUNTING PROFESSIONALS ARE SELECTED AND COMMUNICATION BETWEEN THE USER AND THE SELECTED ACCOUNTING PROFESSIONALS IS FACILITATED OPERATION 217 are monitored and results are tracked to determine the number of successful leads, i.e., leads that result in the services of the accounting professional being secured by the user at optional operation MONITOR RESULTS AND/OR OBTAIN FEEDBACK FROM THE USER AND/OR MATCHED ACCOUNTING PROFESSIONALS AND/OR INCORPORATE FEEDBACK IN THE PROCESS OPERATION 219, process flow proceeds to EXIT OPERATION 231

In one embodiment at EXIT OPERATION 231 process for matching financial management system users with relevantly qualified accounting professionals 200 is exited to await new data.

Using process for matching financial management system users with relevantly qualified accounting professionals 200, an accounting professional referral system is provided that not only takes into account the particular financial management system(s) used by the business/user, but also involves the business owners/managers and the accounting professionals in the process so that the resulting recommendations are based on the specific, and prioritized, needs of the small business owner and the specific, and prioritized, needs, record, and availability, of the accounting professionals. Consequently, using process for matching financial management system users with relevantly qualified accounting professionals 200, a better matching of users to accounting professionals can be obtained that not only saves time, energy, and frustration, but also ensures that more accounting professionals are provided the opportunity to secure good business leads.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols.

Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations.

In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet, or a cloud.

Therefore, numerous variations, whether explicitly provided for by the specification or implied by the specification or not, may be implemented by one of skill in the art in view of this disclosure.

What is claimed is:

1. A system for matching financial management system users with relevantly qualified accounting professionals comprising:

one or more computing processors; and one or more memories, the one or more memories coupled to the one or more computing processors and having collectively stored therein instructions which when executed by the one or more computing processors, perform a process comprising:

implementing a financial management system;

obtaining accounting professional profile data associated with one or more accounting professionals, the accounting professionals being certified, or otherwise trained, in association with the financial management system;

identifying a user of the financial management system as a user potentially needing the services of an accounting professional certified, or otherwise trained, in association with the financial management system;

obtaining user need data associated with the identified user of the financial management system, the user need data indicating one or more accounting professional services needed by the identified user of the financial management system;

determining matching criteria for the identified user of the financial management system based, at least in part, on the user need data associated with the identified user of the financial management system;

analyzing the accounting professional profile data using the matching criteria for the identified user of the financial management system to identify accounting professionals whose accounting professional profile data matches, or most closely matches, the matching criteria for the identified user of the financial management system;

generating a potential accounting professional listing for the user including a listing of one or more identified accounting professionals whose accounting professional profile data matches, or most closely matches, the matching criteria for the identified user of the financial management system;

selecting one or more of the identified accounting professionals in the potential accounting professional listing;

notifying the selected accounting professionals of their selection and provide the selected accounting professionals at least part of the user need data indicating one or more accounting professional services needed by the identified user of the financial management system;

receiving, from a selected accounting professional, information indicating a desire to provide accounting services to the user of the financial management system;

facilitating communication between the selected accounting professional indicating a desire to provide accounting services to the user of the financial management system and the user of the financial management system; and changing data indicating a status of the user of the financial management system to data indicating status of a business lead provided to the selected accounting professional indicating a desire to provide accounting services to the user of the financial management system.

2. The system for matching financial management system users with relevantly qualified accounting professionals of claim 1, wherein;

the financial management system is selected from the group of financial management systems consisting of:

business management systems, packages, programs, modules, or applications;

business financial management systems, packages, programs, modules, or applications;

bookkeeping systems, packages, programs, modules, or applications;

payroll systems, packages, programs, modules, or applications;

inventory systems, packages, programs, modules, or applications;

point-of-sale (POS) systems, packages, programs, modules, or applications;

business tax preparation systems, packages, programs, modules, or applications; and invoicing systems, packages, programs, modules, or applications.

3. The system for matching financial management system users with relevantly qualified accounting professionals of claim 1, wherein;

the accounting professional profile data includes data selected from the group of data consisting of:

data indicating the location of the accounting professionals, and/or their offices, and/or service areas;

data indicating the financial management systems the accounting professionals are certified to work with;

data indicating the various other types of certifications associated with accounting professionals;

data indicating the accounting professionals' experience;

data indicating consumer reviews associated with the accounting professionals; and data indicating special qualifications associated with the accounting professionals.

4. The system for matching financial management system users with relevantly qualified accounting professionals of claim 1, wherein;

the user need data associated with the identified user of the financial management system includes:

data indicating the type of business associated with the user;

data indicating the financial management system used by the user's business;

data indicating a price or rate the user is willing to pay for accounting professional services;

data indicating the amount of accounting professional services needed by the user; and data indicating the type of accounting services needed, such as bookkeeping services, point-of-sale services, payroll services, inventory services, financial management system training, financial management system set up, and/or financial management system data transfer.

5. The system for matching financial management system users with relevantly qualified accounting professionals of claim 1, wherein;

the user need data associated with the identified user of the financial management system is determined automatically by scanning and analyzing user financial data associated with the financial management system.

6. The system for matching financial management system users with relevantly qualified accounting professionals of claim 1, wherein;

at least one of the matching criteria for the identified user of the financial management system is selected from the group of matching criteria consisting of:

matching criteria based on the location of the user, and/or the user's business, and/or a preferred location indicated by the user;

matching criteria based on the financial management system, and/or financial management system version, used by the user's business, and/or features of the financial management system used;

matching criteria based on a price and/or rate the user is willing to pay for accounting professional services;

matching criteria based on the amount of accounting professional services needed by the user; and matching criteria based on the accounting services desired by the user, such as bookkeeping services, point-of-sale services, payroll services, inventory services, financial management system training, financial management system set up, and/or financial management system data transfer.

7. The system for matching financial management system users with relevantly qualified accounting professionals of claim 1, wherein;

the one or more of the identified accounting professionals in the potential accounting professional listing are selected by the user.

8. The system for matching financial management system users with relevantly qualified accounting professionals of claim 1, wherein;

the one or more of the identified accounting professionals in the potential accounting professional listing are selected automatically.

9. The system for matching financial management system users with relevantly qualified accounting professionals of claim 1, wherein;

the selected accounting professionals are notified of their selection and provided at least part of the user need data indicating one or more accounting professional services needed by the identified user of the financial management system via an e-mail, or other text based message, generated through the process for matching financial management system users with relevantly qualified accounting professionals.

10. A system for matching financial management system users with relevantly qualified accounting professionals comprising:
a financial management system used by a user of the financial management system;
a user computing system accessible by the user of the financial management system;
an accounting professional database, the accounting professional database including accounting professional profile data associated with one or more accounting professionals, the accounting professionals being certified, or otherwise trained, in association with the financial management system; and
one or more processors associated with one or more computing systems, the one or more processors associated with one or more computing systems implementing a process for matching financial management system users with relevantly qualified accounting professionals, the process for matching financial management system users with relevantly qualified accounting professionals comprising:
using the one or more processors associated with one or more computing systems to identify the user of the financial management system as a user potentially needing the services of an accounting professional certified, or otherwise trained, in association with the financial management system;
using the one or more processors associated with one or more computing systems to obtain user need data associated with the user of the financial management system, the user need data indicating one or more accounting professional services needed by the user of the financial management system;
using the one or more processors associated with one or more computing systems to determine matching criteria for the user of the financial management system based, at least in part, on the user need data associated with the user of the financial management system;
using the one or more processors associated with one or more computing systems to analyze the accounting professional profile data in the accounting professional profile database using the matching criteria for the user of the financial management system to identify accounting professionals whose accounting professional profile data matches, or most closely matches, the matching criteria for the user of the financial management system;
using the one or more processors associated with one or more computing systems to generate a potential accounting professional listing for the user including a listing of one or more identified accounting professionals whose accounting professional profile data matches, or most closely matches, the matching criteria for the user of the financial management system;
selecting one or more of the identified accounting professionals in the potential accounting professional listing;
using the one or more processors associated with one or more computing systems to notify the selected accounting professionals of their selection and provide the selected accounting professionals at least part of the user need data indicating one or more accounting professional services needed by the user of the financial management system;
a selected accounting professional indicating a desire to provide accounting services to the user of the financial management system;
using the one or more processors associated with one or more computing systems to facilitate communication between the selected accounting professional indicating a desire to provide accounting services to the user of the financial management system and the user of the financial management system; and
using the one or more processors associated with one or more computing systems to change data indicating a status of the user of the financial management system to data indicating status of a business lead provided to the selected accounting professional indicating a desire to provide accounting services to the user of the financial management system.

11. The system for matching financial management system users with relevantly qualified accounting professionals of claim 10, wherein;
the financial management system is selected from the group of financial management systems consisting of:
business management systems, packages, programs, modules, or applications;
business financial management systems, packages, programs, modules, or applications;
bookkeeping systems, packages, programs, modules, or applications;
payroll systems, packages, programs, modules, or applications;
inventory systems, packages, programs, modules, or applications;
point-of-sale (POS) systems, packages, programs, modules, or applications;
business tax preparation systems, packages, programs, modules, or applications; and
invoicing systems, packages, programs, modules, or applications.

12. The system for matching financial management system users with relevantly qualified accounting professionals of claim 10, wherein;
the accounting professional profile data includes data selected from the group of data consisting of:
data indicating the location of the accounting professionals, and/or their offices, and/or service areas;
data indicating the financial management systems the accounting professionals are certified to work with;
data indicating the various other types of certifications associated with accounting professionals;
data indicating the accounting professionals' experience;
data indicating consumer reviews associated with the accounting professionals; and
data indicating special qualifications associated with the accounting professionals.

13. The system for matching financial management system users with relevantly qualified accounting professionals of claim 10, wherein;
the user need data associated with the identified user of the financial management system includes:
data indicating the type of business associated with the user;
data indicating the financial management system used by the user's business;
data indicating a price or rate the user is willing to pay for accounting professional services;

data indicating the amount of accounting professional services needed by the user; and data indicating the type of accounting services needed, such as bookkeeping services, point-of-sale services, payroll services, inventory services, financial management system training, financial management system set up, and/or financial management system data transfer.

14. The system for matching financial management system users with relevantly qualified accounting professionals of claim 10, wherein;

the user need data associated with the identified user of the financial management system is determined automatically by scanning and analyzing user financial data associated with the financial management system.

15. The system for matching financial management system users with relevantly qualified accounting professionals of claim 10, wherein;

at least one of the matching criteria for the identified user of the financial management system is selected from the group of matching criteria consisting of:

matching criteria based on the location of the user, and/or the user's business, and/or a preferred location indicated by the user;

matching criteria based on the financial management system, and/or financial management system version, used by the user's business, and/or features of the financial management system used;

matching criteria based on a price and/or rate the user is willing to pay for accounting professional services;

matching criteria based on the amount of accounting professional services needed by the user; and matching criteria based on the accounting services desired by the user, such as bookkeeping services, point-of-sale services, payroll services, inventory services, financial management system training, financial management system set up, and/or financial management system data transfer.

* * * * *